United States Patent
Gabas

[19]

[11] Patent Number: 5,520,067
[45] Date of Patent: May 28, 1996

[54] CHECK VALVE FOR HYDRAULIC SELF-REGULATING DEVICE PISTONS

[75] Inventor: Carlos Gabas, Barcelona, Spain

[73] Assignee: Fico Cables, S.A., Barcelona, Spain

[21] Appl. No.: 244,005

[22] PCT Filed: Sep. 15, 1993

[86] PCT No.: PCT/ES93/00076

§ 371 Date: Jun. 23, 1994

§ 102(e) Date: Jun. 23, 1994

[87] PCT Pub. No.: WO94/08148

PCT Pub. Date: Apr. 14, 1994

[30] Foreign Application Priority Data

Oct. 2, 1992 [ES] Spain ................... 9201947

[51] Int. Cl.[6] .................................................. F16C 1/22
[52] U.S. Cl. ........................... 74/501.5 H; 74/501.5 R; 74/502.4; 74/502.6; 192/111 A; 137/843
[58] Field of Search ................... 74/500.5, 501.5 R, 74/502, 502.4, 502.6; 192/111 A; 92/181 P, 209, 255, 256; 137/843

[56] References Cited

U.S. PATENT DOCUMENTS

| | | | |
|---|---|---|---|
| 1,028,400 | 6/1912 | Stanton | 74/501.5 H |
| 2,375,050 | 5/1945 | Tauscher | 74/501.5 H |
| 2,405,062 | 7/1946 | Sheldon | 74/501.5 H |
| 3,171,526 | 3/1965 | Maclawek | 192/111 A |
| 3,417,768 | 12/1968 | Wasson | 137/843 |
| 5,341,723 | 8/1994 | Hung | 92/181 P |

FOREIGN PATENT DOCUMENTS

| | | | |
|---|---|---|---|
| 0173625 | 3/1986 | European Pat. Off. | |
| 3533405 | 3/1987 | Germany | 74/501.5 R |
| 3452570 | 11/1970 | Japan | 192/111 A |
| 9002014 | 7/1990 | Spain . | |
| 2018933 | 10/1979 | United Kingdom . | |
| 9201871 | 2/1992 | WIPO . | |

*Primary Examiner*—Richard M. Lorence
*Assistant Examiner*—Chong H. Kim
*Attorney, Agent, or Firm*—Michael J. Striker

[57] ABSTRACT

A check valve for pistons of hydraulic self-adjusting devices comprises a flow body (10) formed by a frustoconical portion linked at the smaller diameter end thereof with a cylindrical portion the free end of which is attached to the inner end of the rod of the device, and by a stopper body coaxial with said rod and which may freely slide on said cylindrical portion. The axial bore of the stopper body has at the end thereof facing the flow body a seal seat of progressively increasing size dimensioned to mate with the sealing gasket of the flow body. The configuration of the seal seat and of the sealing gasket cause progressive closing of the valve when the rod is pulled, which allows during closing the flow of fluid between both half-chambers of the main body.

6 Claims, 2 Drawing Sheets

CHECK VALVE FOR HYDRAULIC SELF-REGULATING DEVICE PISTONS

BACKGROUND OF THE INVENTION

This invention relates to a check valve for hydraulic self-regulating device pistons which is particularly applicable to hydraulic self-regulating devices for regulating the length of control cables.

The known hydraulic self-regulating devices for compensation of variations of control cable lengths are constituted, in general, by an essentially cylindrical main hollow body containing a piston, a liquid fluid, a regulating rod attached at one end to the corresponding end of the control cable and a regulating spring which exerts a permanent pull on the control cable by way of the regulating rod.

Spanish patent P 9002014 discloses a hydraulic self-regulating device in which the regulating rod extends out from one end of the main body and is connected to the corresponding end of the control cable and the other end of the rod, which remains housed in the main body, is attached to a piston comprising a check valve which may have different embodiments. This piston defines in the main body two half-chambers respectively located one on each side of the piston.

One embodiment of said check valve disclosed in Spanish patent P 9002014 comprises a flow body, a stopper body and an opening spring. The flow body is attached to the regulating rod and is provided with orifices forming a communication between the two half-chambers defined in the main body by the piston, the flow body also having a perimetrical sealing gasket. The stopper body is coaxially disposed around the regulating rod and may slide in both directions so that, by means of a sealing gasket, it may open or close the flow body orifices. And the opening spring is permanently under compression and is arranged coaxially around the regulating rod between the flow body and the stopper body while bearing against the respective opposed faces.

In general, both the above described embodiment and the remaining embodiments of the piston check valve disclosed in Spanish patent P 9002014 suffer from the drawback of being formed by a large number of expensive-to-make components, which increases both the production costs and the assembly costs of the valve and, consequently, of the self-regulating device.

SUMMARY OF THE INVENTION

With a view to providing a new check valve embodiment which with a small number of components is capable of providing a solution for the above described problems, there is disclosed a check valve for hydraulic self-regulating device pistons of new structure and very high reliable operativeness.

The check valve of the invention is part of the piston of a hydraulic self-regulating device which includes:

an essentially cylindrical hollow main body having at one end a cap which may be provided with a volumetric compensating device and at the other end, which is closed, fixing means, said main body containing a liquid fluid, a regulating rod and a regulating spring;

a regulating rod, one end of which extends from the main body through the closed end thereof and is attached to the corresponding end of the control cable, the length of which is to be permanently and automatically regulated and the other end of which is permanently housed inside the main body and is attached to the piston having the check valve and;

a regulating spring disposed coaxially around the regulating rod and being under permanent compression, bearing at one end against the closed end of the main body and at the other end against the inner end of the regulating rod on an annular shoulder.

The check valve of the invention which, together with the piston, is attached to the end of the regulating rod remaining inside the main body of the self-regulating device. It comprises a flow body and a stopper body in which the flow body is composed of a frustoconical portion and a cylindrical portion, the smaller diameter end of the frustoconical portion being longitudinally connected to the said cylindrical portion, the free end of which is firmly attached in longitudinal alignment with the inner end of the regulating rod, the frustoconical portion being provided with a lateral coaxial groove in which there is housed a flexible gasket, being formed on the front face or larger diameter base with a concave surface and, around the perimeter, with a plurality of guide projections so dimensioned that the flow body may snugly slide against the inner surface of the main body and the liquid fluid contained therein may flow freely through the free passages defined between each pair of guide projections and the inner surface of the main body. The stopper body is essentially cylindrical and is coaxially disposed around the cylindrical portion of the flow body, said stopper body having an axial bore so dimensioned to allow it loosely to slide on said cylindrical portion of the flow body allowing the liquid fluid contained in the main body to flow through the passage defined by the flow and stopper bodies, said axial bore having at the end thereof opposite the flow body a seal seat of progressively variable size dimensioned to mate with the sealing gasket of the flow body, the stopper body having a lateral coaxial groove in which there is housed a perimetrically outwardly extending resilient packing which, by resilient reaction, permanently bears against the inner surface of the main body so as to prevent the liquid fluid contained in said main body from flowing through the fit determined by the packing between the stopper body and the inner surface of the main body.

The valve of the invention is also characterized in that the progressively variable size seal seat of the stopper body has a tapering elliptical form in the direction of movement of the flow body during closing of the valve and in that the passage body sealing gasket is of circular cross section.

The valve of the invention, the features of which have been described above is composed by a very small number of parts over the known embodiments of check valves for pistons of hydraulic self-regulating devices. In this way, both the production and the assembly costs and, in a word, the overall cost of the self-regulating device are reduced. Furthermore, the valve of the invention is extremely reliable in operation.

When the regulating rod of the hydraulic self-regulating device is in the rest position, i.e. when the regulating rod is not pulled by the control cable, the check valve of the invention is open and, under these conditions, the resilient packing of the valve stopper body holds, as a result of the resilient reaction against the inner surface of the main body, the position occupied by the stopper body relative to the main body, whereby the liquid fluid contained in the latter may flow freely through the axial bore of the stopper body and the passages defined by the guide projections of the flow body, thereby establishing communication between the two half-chambers defined in the main body by the check valve of the invention. On the contrary, when the regulating rod is pulled by the control cable, the flow body is moved towards the stopper body and the sealing gasket of the flow body presses against the seal seat of the stopper body and blocks, by progressive resilient deformation of the said sealing gasket, the fluid flow between the two half-chambers of the main body. The progressive blocking of the liquid fluid flow during the closing of the check valve occurs precisely because of the characteristic shape of the seal seat of the stopper body and of the sealing gasket of the flow body. In fact, the elliptical cross section of the seal seat and the toroidal shape of the sealing gasket mean that, while the valve is closing, the sealing gasket starts resiliently to deform and close at the portion thereof contacting the smaller diameter portion of the seal seat and progressively finalizes the resilient closure deformation when the whole of the sealing gasket contacts the surface of the seal seat.

In other words, when the control cable is operated, i.e. when it is subjected to a pulling force, the valve does not close instantaneously. In fact, since the seal seat has a progressively variable size, the valve closes progressively so that, during the early moments of partial contact of the sealing gasket with the stopper body (i.e. the piston), the latter is pushed and moved inside the main body thanks to the liquid fluid compressed in the half-chamber containing the rod being able to flow to the other half-chamber. This movement of the stopper body continues until the gasket becomes completely hermetically closed, preventing the fluid flow and, consequently, making the relative positions of the stopper body and the main body firmly stable. Then, the control cable starts to fulfil its proper mechanical function.

When the control cable is released from the pulling force, the spring of the device pushes the rod in the opposite direction to closing so that the free fluid flow is reestablished between both half-chambers and, thereafter, it pushes the stopper body (i.e. the piston) towards the original position which it may freely attain. If the length of the control cable must be extended for mechanical needs, the piston will remain in a further advanced position (i.e. it will not reach its original position) so that the rod may extend outwardly over a greater length corresponding to the increase in length required by the control cable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
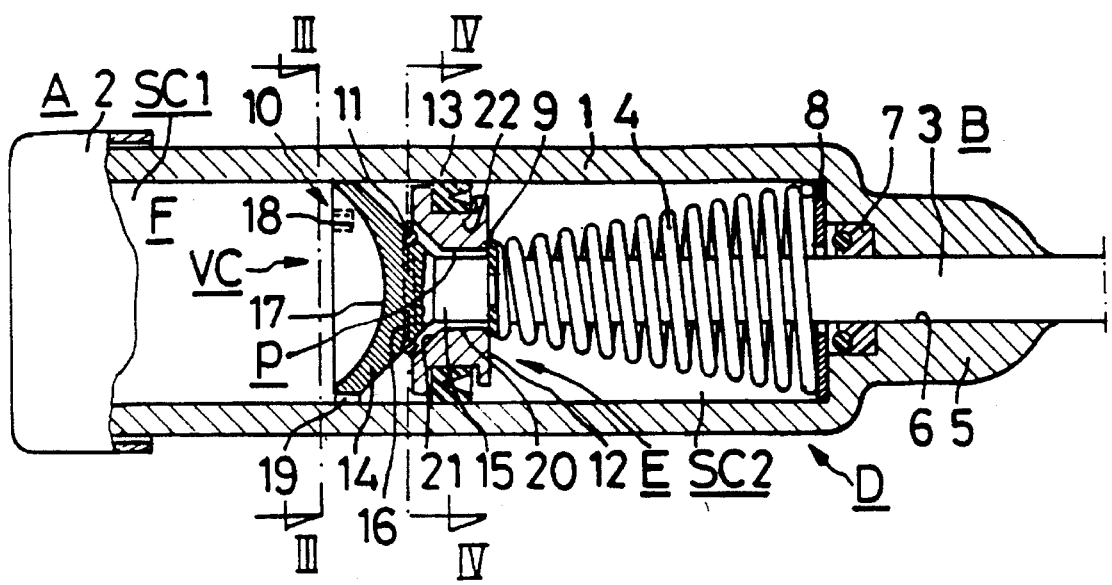
FIG. 1 is a part cross-section view showing the valve of the invention attached to a hydraulic self-regulating device, with the valve in the open position.
Figure 2:
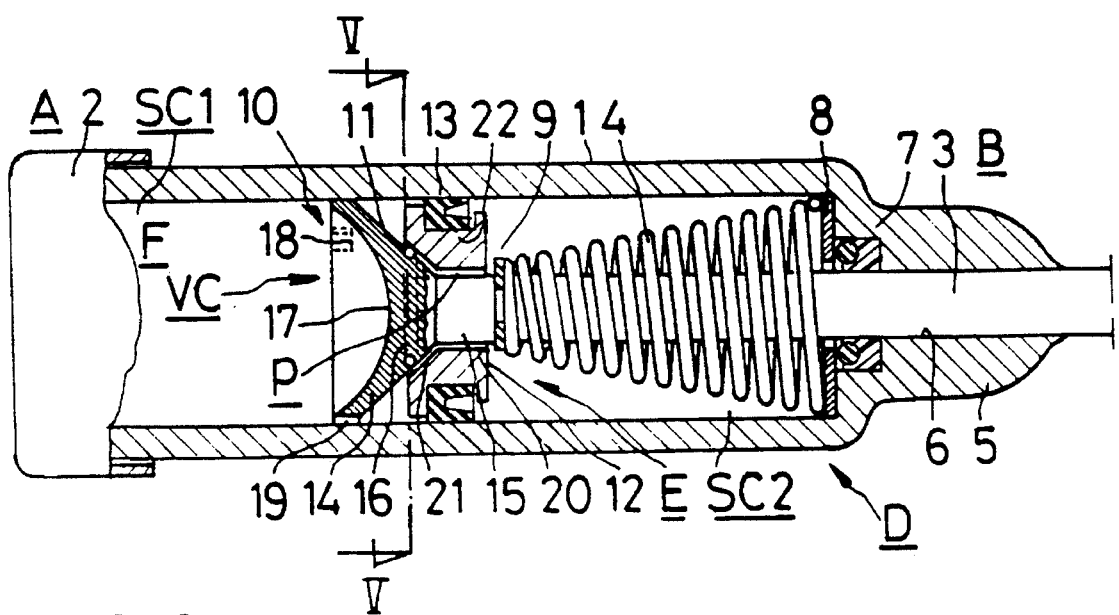
FIG. 2 is a part cross-section view showing the valve of the invention attached to the hydraulic self-regulating device of FIG. 1, with the valve in the closed position.
Figure 3:
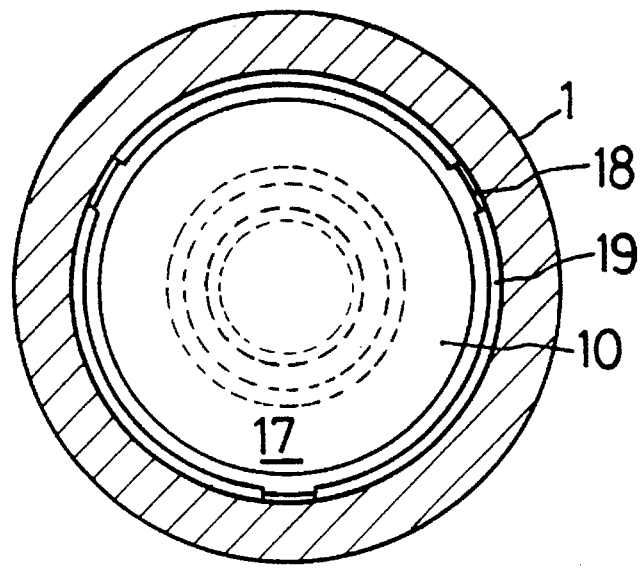
FIGS. 3 and 4 are cross-section views on the lines III—III and IV—IV of FIG. 1.
Figure 4:
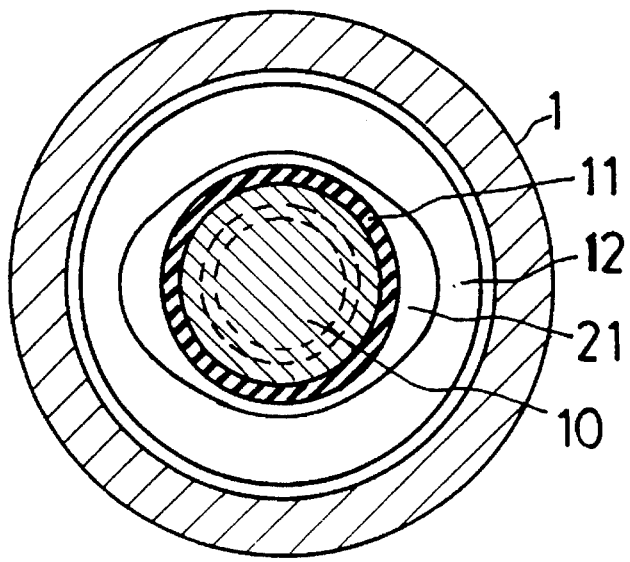
Figure 5:
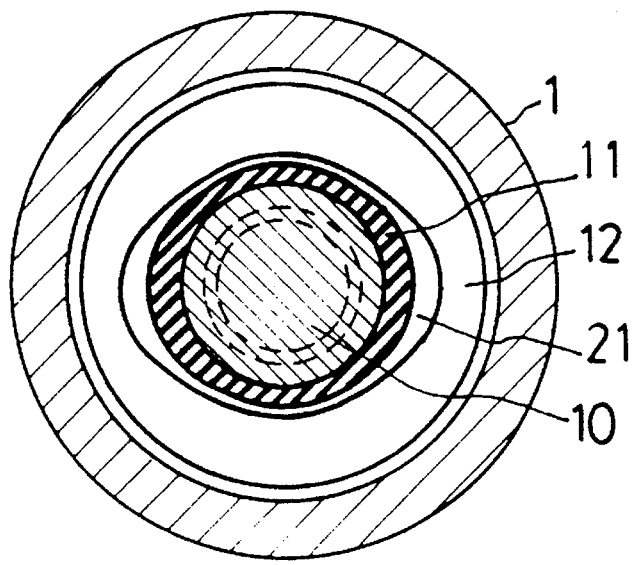
FIG. 5 is a cross-section view on the line V—V of FIG. 2.

In the embodiment of the check valve of the invention, the hydraulic self-regulating device D shown in FIGS. 1 and 2 and in which the said check valve is mounted, is for permanent automatic regulation of the length of a control cable. In this example, it is the control cable linking the clutch mechanism of an automobile with the corresponding clutch pedal. For greater clarity of disclosure, the clutch mechanism, control cable and clutch pedal have not been shown in the drawings. It will be understood that the length of a control cable applied to any other mechanism requiring this mechanical control could be regulated.

FIGS. 1 to 5 show how the device D comprises all the elements described above, i.e. the main body 1, the end cap 2, the regulating rod 3, the regulating spring 4 and the liquid fluid F contained in the main body 1.

The main body 1 of the device D is hollow and is essentially cylindrical. At one end, referenced A, there is the end cap 2 and at the other end, referenced B, there is the longitudinal extension 5 forming the means for the positional fixing of the main body 1 to the fork of the clutch mechanism pressure plate, all as shown in FIGS. 1 and 2.

The end cap 2 of the device D may be provided with a volumetric compensating device for compensating the volume variations of the liquid fluid F contained in the main body 1 due to temperature changes. This volumetric compensating device may also serve to compensate the volume variations of the portion of the regulating rod 3 contained in the main body 1 while the device D is operating. For the same reasons as given above, the said volumetric compensating device has not been shown in the drawings.

FIGS. 1 and 2 show how the regulating rod 3 of the device D extends at one end thereof from the closed end B of the main body 1 through the longitudinal extension 5 by means of the axial bore 6 where there is a sealing gasket 7 preventing the liquid fluid F from leaking to the outside. These same FIGS. 1 and 2 show how there is mounted on the end of the regulating rod 3, permanently inside the main body 1, the piston E defining the two half-chambers SC1 and SC2 inside the main body 1. And it is at the end of the regulating rod 3 extending from the main body 1 where the corresponding end of the control cable linking the clutch mechanism with the corresponding clutch pedal is attached.

FIGS. 1 and 2 show how the essentially frustoconical coil regulating spring is coaxially disposed around the regulating rod 3 and is under permanent compression, with the larger diameter end bearing against the inner wall of the closed end B of the main body 1 by way of the washer 8 and with the smaller diameter end bearing against the annular shoulder 9 fixedly attached to the regulating rod 3. In this way, the regulating spring 4 keeps the control cable tensioned at all times by way of the regulating rod 3.

The above description of the hydraulic self-regulating device D is known and is regularly used in devices which, based on a structure similar to the one described, are for permanently automatically regulating the length of control cables.

The check valve VC of the invention forms part of the body of the piston E. As shown in FIGS. 1 to 5, said check valve VC comprises the flow body 10, the O-ring seal 11, the stopper body 12 and the packing 13.

FIGS. 1 and 2 show how the flow body 10 comprises the frustoconical portion 14 which is axially extended at the smaller diameter end thereof with the cylindrical portion 15 attached, in longitudinal alignment, with the inner end of the regulating rod 3. The frustoconical portion 14 of the flow body 10 is provided on the side surface thereof with the coaxial groove 16 in which there is located the O-ring seal 11. This frustoconical portion 14 is formed on the larger diameter end thereof with the concave surface 17 and around the perimeter thereof with three guide projections 18 shown in detail in FIG. 3 and which, equidistantly spaced apart, define the three corresponding passages 19 allowing the fluid F contained in the main body 1 to flow freely between the two half-chambers SC1 and SC2.

The stopper body 12 is essentially cylindrical and is arranged coaxially around the regulating rod 3 and between the flow body 10 and the annular shoulder 9 of the regulating rod 3, the arrangement being as shown in FIGS. 1 and 2. The stopper body 12 has the axial bore 20 provided at the end facing the flow body 10 with the seal seat 21 which, as shown in detail in FIGS. 4 and 5, has, in this embodiment of the check valve VC an elliptical cross-section tapering in the closing direction of the flow body 10. The axial bore 20 is dimensioned such that the stopper body 12 may loosely slide on the cylindrical portion 15 of the flow body 10 and, when the check valve VC is open, the liquid fluid F may flow freely through the passage p defined by the flow body 10 and the stopper body 12. As shown in FIGS. 1 and 2, the stopper body 12 has the lateral coaxial groove 22 in which there is firmly seated the packing 13 extending outwards from the perimeter thereof.

When the hydraulic self-regulating device D is mounted in an automobile under appropriate service conditions, the check valve VC of the invention described as an embodiment operates as described hereafter.

In FIG. 1, the regulating rod 3 is in the rest position, i.e. it is not being pulled by the control cable. Under these conditions, the check valve VC is open and the liquid fluid F can flow freely between the two half-chambers SC1 and SC2 of the main body 1 through the axial bore 20 of the stopper body 12 and of the passages 19 defined by the guide projections 18 of the flow body 10. Also under these conditions, the stopper body 12 maintains its position relative to the main body 1 by the action of the packing 13 permanently pressing by resilient reaction against the inner surface of the main body 1.

In FIG. 2, the regulating rod 3 has been pulled by the control cable and, under these conditions, the regulating spring 4 is compressed and the check valve VC is closed, preventing the fluid flow between the half-chambers SC1 and SC2 of the main body 1. Also under these conditions, the stopper body 12 holds its position relative to the main body 1 because of the non-compressibility of the liquid fluid contained in the half-chamber SC2.

When the regulating rod 3 ceases to be pulled, the regulating spring 4 urges the regulating rod 3 and, consequently, the flow body 10 of the check valve VC, by resilient reaction, to a position such as the one shown in FIG. 1 in which the check valve VC is open and the liquid fluid F may flow freely between the two half-chambers SC1 and SC2 of the main body 1. During the opening of the valve VC, the stopper body 12 is displaced by the annular shoulder 9 of the regulating rod 3 towards the initial position which it may freely attain, the position reached being held by the stopper body 12 by the action of its packing 13 which, as said above, bears permanently by resilient reaction against the inner surface of the main body 1.

When the regulating rod 3 is pulled by the control cable, i.e. when the clutch pedal is pressed, the flow body 10 is moved towards the stopper body 12 and the passage p, defined by the flow body 10 and the stopper body 12 jointly, is progressively closed, preventing the flow of liquid fluid between the two half-chambers SC1 and SC2 of the main body 1. In fact, the characteristic elliptical section seal seats 21 of the stopper body 12 and the O-ring seal 11 of the flow body 10 determine the progressive closing of the valve VC of the invention, in the following way. The axial movement of the flow body 10 causes the O-ring seal 11 to start to deform elastically on entering into contact with the seal seat 21 on being pressed against the smaller diameter portion of the seal seat 21. This resilient deformation of the O-ring seal 11 continues under the urging of the flow body 10 attached to the regulating rod 3, until the whole of the O-ring seal 11 is pressed into contact with the surface of the seal seat 21.

In this way, when the cable is pulled, the piston E moves inside the main body 1 while the liquid fluid F can flow between the two half-chambers SC1 and SC2 until such time as when the valve VC closes completely, the piston E and the main body 1 become completely rigid with each other and then, when the control cable is released, the piston E returns to the original position thereof with the capability of occupying an intermediate position so that the regulating rod 3 may extend outwardly to a greater extent than before, to provide the cable with a greater length automatically.

It will be understood that each of the elements described above, or two or more together, may also find a useful application in other types of constructions differing from the types described above.

While the invention has been illustrated and described as embodied in a check valve for hydraulic self-regulating device pistons, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A check valve for a piston of a hydraulic self-regulating device having a hollow main body with one end provided with a cap and another closed end provided with fixing means, a regulating rod with one end extending from said main body through said closed end and attachable to a corresponding end of a control cable whose length is to be regulated and another end permanently housed inside said main body and attached to a piston, and a regulating spring located coaxially around the regulating rod and being under permanent compression so as to bear at one against said closed end of the main body and at another end against an inner end of an annular shoulder on the regulating rod, the check valve comprising a flow body including a frustoconical portion and a cylindrical portion with a smaller diameter end of said frustoconical portion being longitudinally connected to said cylindrical portion a free end of which is attachable with the inner end of the regulating rod, said frustoconical portion being provided with a lateral coaxial groove accommodating a sealing gasket with a concave surface and a plurality of guide projections dimensioned so that said flow body is adapted to snugly slide against an inner surface of the main body and a fluid flows freely through free passages provided between each pair of said guide projections; a stopper body coaxially located around said cylindrical portion of said flow body and having an axial bore dimensioned so as to allow it to loosely slide on said cylindrical portion of said flow body allowing the fluid to flow through a passage defined by said flow body and said stopper body, said axial bore at an end opposite said flow body having a valve seat of a progressively variable size dimensioned to mate with said sealing gasket of said flow body, said stopper body having a lateral coaxial groove accommodating a perimetrically outwardly extending resilient packing is adapted to permanently bear against the inner surface of the main body.

2. A valve as defined in claim 1, wherein said stopper body is substantially cylindrical.

3. A valve as defined in claim 1, wherein said progressively variable size valve seat of said stopper body has a tapering elliptical form in a direction of movement of said flow body during closing of the valve, said sealing gasket of said flow body having a circular cross-section.

4. A hydraulic self-regulating device, comprising a hollow main body with one end provided with a cap and another closed end provided with fixing means; a regulating rod with one end extending from said main body through said closed end and attachable to a corresponding end of a control cable whose length is to be regulated and another end permanently housed inside said main body and attached to a piston; and a regulating spring located coaxially around the regulating rod and being under permanent compression so as to bear at one against said closed end of the main body and at another end against an inner end of an annular shoulder on the regulating rod; and a check valve for said piston, said check valve including a flow body having a frustoconical portion and a cylindrical portion with a smaller diameter end of said frustoconical portion being longitudinally connected to said cylindrical portion a free end of which is attachable with the inner end of the regulating rod, said frustoconical portion being provided with a lateral coaxial groove accommodating a sealing gasket with a concave surface and a plurality of guide projections dimensioned so that said flow body snugly slides against an inner surface of the main body and a fluid flows freely through free passages provided between each pair of said guide projections and the inner surface of the main body; a stopper body coaxially located around said cylindrical portion of said flow body and having an axial bore dimensioned so as to allow it to loosely slide on said cylindrical portion of said flow body allowing the fluid contained in the main body to flow through a passage defined by said flow body and said stopper body, said axial bore at an end opposite said flow body having a valve seat of a progressively variable size dimensioned to mate with said sealing gasket of said flow body, said stopper body having a lateral coaxial groove accommodating a perimetrically outwardly extending resilient packing which due to its resiliency permanently bears against the inner surface of the main body so as to prevent fluid from flowing through a fit determined by said packing between said stopper body and the inner surface of the main body.

5. A valve as defined in claim 4, wherein said hollow main body is essentially cylindrical and said stopper is also substantially cylindrical.

6. A valve as defined in claim 4, wherein said progressively variable size valve seat of said stopper body has a tapering elliptical form in a direction of movement of said flow body during closing of the valve, said sealing gasket of said flow body having a circular cross-section.

* * * * *